(12) United States Patent
Park et al.

(10) Patent No.: US 6,846,215 B2
(45) Date of Patent: Jan. 25, 2005

(54) APPARATUS FOR REMOVING BUBBLES FROM SEALANT FOR FABRICATING LIQUID CRYSTAL DISPLAY DEVICE

(75) Inventors: Moo Yeol Park, Taegu-kwangyokshi (KR); Sung Su Jung, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 222 days.

(21) Appl. No.: 10/321,493

(22) Filed: Dec. 18, 2002

(65) Prior Publication Data

US 2003/0177905 A1 Sep. 25, 2003

(30) Foreign Application Priority Data

Mar. 25, 2002 (KR) .............................. P10-2002-0015971

(51) Int. Cl.⁷ .......................... H01J 9/00; G02F 1/1339
(52) U.S. Cl. ........................ 445/24; 349/156; 349/184; 156/106
(58) Field of Search .......................... 445/24; 349/156, 349/184, 189, 192, 155, 158, 160, 18; 156/106, 107

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. .......... 29/592 R |
| 4,653,864 A | 3/1987 | Baron et al. |
| 4,691,995 A | 9/1987 | Yamazaki et al. ...... 350/331 R |
| 4,775,225 A | 10/1988 | Tsuboyama et al. |
| 5,247,377 A | 9/1993 | Omeis et al. .................. 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe .............................. 141/7 |

(List continued on next page.)

FOREIGN PATENT DOCUMENTS

| | | |
|---|---|---|
| EP | 1 003 066 A1 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |

*Primary Examiner*—Joseph Williams
(74) *Attorney, Agent, or Firm*—Morgan, Lewis & Bockius LLP

(57) ABSTRACT

An apparatus for removing bubbles from a sealant for fabricating a liquid crystal display device is disclosed in the present invention. The apparatus includes a drum, a rotating shaft in the drum, a first gear at an upper portion of the rotating shaft, a second gear matching the first gear, and a container at a lower portion of the second gear including an interior container accommodating a sealant, an exterior container surrounding the interior container, a space receiving cooling water between the interior container and the exterior container, a sealant discharge port formed at a lower portion of the interior container, and a water introducing port formed at the exterior container.

11 Claims, 3 Drawing Sheets

U.S. PATENT DOCUMENTS

| | | | |
|---|---|---|---|
| 5,539,545 A | 7/1996 | Shimizu et al. | |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | von Gutfeld et al. | 349/187 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 2001/0021000 A1 | 9/2001 | Egami | 349/187 |

FOREIGN PATENT DOCUMENTS

| | | |
|---|---|---|
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

APPARATUS FOR REMOVING BUBBLES FROM SEALANT FOR FABRICATING LIQUID CRYSTAL DISPLAY DEVICE

This application claims the benefit of the Korean Patent Application No. P2002-015971 filed on Mar. 25, 2002, which is hereby incorporated by reference.

BACKGROUND OF THE INVENTION

1. Field of the Invention

The present invention relates to a liquid crystal display device, and more particularly, to an apparatus for removing bubbles from a sealant for fabricating a liquid crystal display device. Although the present invention is suitable for a wide scope of applications, it is particularly suitable for reliably forming a sealant on the substrates.

2. Discussion of the Related Art

A thin flat panel display tends to have a thickness no more than a few centimeters. Particularly, the liquid crystal display device has a wide scope of application, such as portable computers, television and computer monitors, and gauge monitors for spaceships and airplanes due to a low driving voltage, a low consumption power, and a portability.

As shown in FIG. 1, a liquid crystal display device generally includes a lower substrate 1 having a thin film transistor and a pixel electrode, an upper substrate 3 facing into the lower substrate 10 and having a light shielding film, a color filter layer, a common electrode, and a liquid crystal layer 5 interposed between both the upper and lower substrates 3 and 1.

A sealant 7 is formed between the upper and lower substrates 3 and 1 to prevent the liquid crystal 5 from leaking and to bond the upper and lower substrates 3 and 1 to each other.

A method of fabricating the liquid crystal display device having the above-described structure is classified into a vacuum injection method and a liquid crystal dropping method, depending upon the method of forming the liquid crystal layer between the upper and lower substrates.

A method of fabricating the liquid crystal display device according to the vacuum injection method will now be described.

A lower substrate having a thin film transistor and a pixel electrode, and an upper substrate having a light shielding film, a color filter layer, and a common electrode are prepared.

A sealant is dispensed to either of the upper and lower substrates to prevent the liquid crystal from leaking and to attach the lower and upper substrates to each other. A thermo-hardening sealant formed of epoxy resin or the like may be used to attach the substrates.

After attaching the upper and lower substrates to each other, the thermo-hardening sealant is hardened by a heating process to bond the upper and lower substrates to each other.

After the bonded substrates are loaded into a vacuum chamber and the inner space between the substrates is maintained at a vacuum condition, the bonded substrates are dipped in a vessel containing a liquid crystal to form a liquid crystal layer between the bonded substrates.

However, the vacuum injecting method has a drawback in that, as a display screen becomes larger in size, a time required for injecting the liquid crystal is extended, thereby reducing productivity.

The liquid crystal dropping method is used to resolve such problems and disadvantages. The steps of preparing upper and lower substrates, forming a spacer, and dispensing a sealant are similar to those in the vacuum injecting method.

In the liquid crystal dropping method, the step of dropping the liquid crystal within the boundary of the sealant formed on the lower substrate is carried out before the step of attaching the substrates to each other.

In other words, the liquid crystal dropping method includes the attaching step of the both substrates after dropping the liquid crystal. When the thermo-hardening sealant is used, the sealant is molten and flows into the liquid crystal during a heating process, thereby contaminating the liquid crystal. For this reason, the liquid crystal dropping method employs a photo-hardening sealant made of acrylic resin.

Accordingly, after the step of attaching the substrates, the substrates are bonded to each other by irradiating UV-ray onto the substrates.

When the thermo-hardening sealant or the photo-hardening sealant used in the vacuum injecting method or the liquid crystal dropping method is made of epoxy resin or acrylic resin only, it has to be fully compressed between the substrates during the attaching step. Thus, a cell gap cannot be maintained. Accordingly, the epoxy resin or acrylic resin is mixed with glass fiber in order to maintain a uniform cell gap.

Since the sealant is mixed with glass fiber, bubbles are formed within the sealant. So, when the sealant having bubbles is dispensed on either the upper substrate or the lower substrate, openings are formed at the portion containing the bubbles, thereby reducing the adhesion of the attached substrates.

Therefore, a step of removing the bubbles of the sealant is carried out before the sealant is dispensed onto the substrate.

FIG. 2A is a partial-cut perspective view of a related art apparatus for removing bubbles from the sealant.

As shown in FIG. 2A, the related art apparatus for removing bubbles from the sealant includes a drum 10, a rotating shaft 20 formed in the drum 10, and a bubble removing container 30.

A first gear 22 is formed at an upper portion of the rotating shaft 20. A second gear 32 is formed at an upper portion of the bubble removing container 30. Herein, the first gear 22 matches the second gear 32.

Accordingly, as the rotating shaft 20 rotates, the bubble removing container 30 and the drum 10 also rotate along with the rotating shaft 20. As the drum 10 rotates, the bubble removing container 30 rotates in large circles.

According to the above-described structure, the sealant is introduced into the bubble removing container 30, whereby the bubble removing container 30 rotates to remove bubbles from the sealant.

FIG. 2B is an enlarged view of the related art bubble removing container 30 having a simple beaker shape and a discharge port for discharging the sealant at the bottom portion.

Generally, since the sealant has a high viscosity, the temperature of the sealant rises due to friction with the inner wall of the bubble removing container 30 during the rotation of the container 30. The rise in temperature changes the characteristics of the sealant.

SUMMARY OF THE INVENTION

Accordingly, the present invention is directed to an apparatus for removing bubbles from a sealant for fabricating a liquid crystal display device that substantially obviates one or more of problems due to limitations and disadvantages of the related art.

Another object of the present invention is to provide an apparatus for removing bubbles from a sealant for fabricating a liquid crystal display device that prevents deterioration of the sealant while removing the bubbles from the sealant.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a container for removing bubbles from a sealant includes an interior container accommodating a sealant, an exterior container surrounding the interior container, a space receiving cooling water between the interior container and the exterior container, a sealant discharge port at a lower portion of the interior container, and a water introducing port at the exterior container.

In another aspect of the present invention, an apparatus for removing bubbles from a sealant includes a drum, a rotating shaft in the drum, a first gear at an upper portion of the rotating shaft, a second gear matching the first gear, and a container at a lower portion of the second gear including an interior container accommodating a sealant, an exterior container surrounding the interior container, a space receiving cooling water between the interior container and the exterior container, a sealant discharge port at a lower portion of the interior container, and a water introducing port at the exterior container.

Herein, a method of using the container for removing bubbles from a sealant according to the present invention includes introducing a sealant into the container, removing bubbles from the sealant by rotating the container, forming the bubble removed sealant on one of first and second substrates, and bonding the first and second substrates to each other.

Furthermore, a method of using the apparatus for removing bubbles from a sealant according to the present invention includes introducing a sealant into the apparatus, removing bubbles from the sealant by rotating the apparatus, forming the bubble removed sealant on one of first and second substrates, and bonding the first and second substrates to each other.

The present invention employs a dual container including interior and exterior containers so that the cooling water can be introduced between the containers. Therefore, it prevents the sealant from being deformed during the process of removing the bubbles formed in the sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
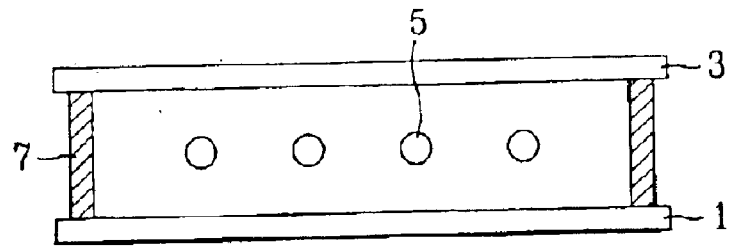
FIG. 1 is a cross-sectional view of a related art liquid crystal display device.
Figure 2A:
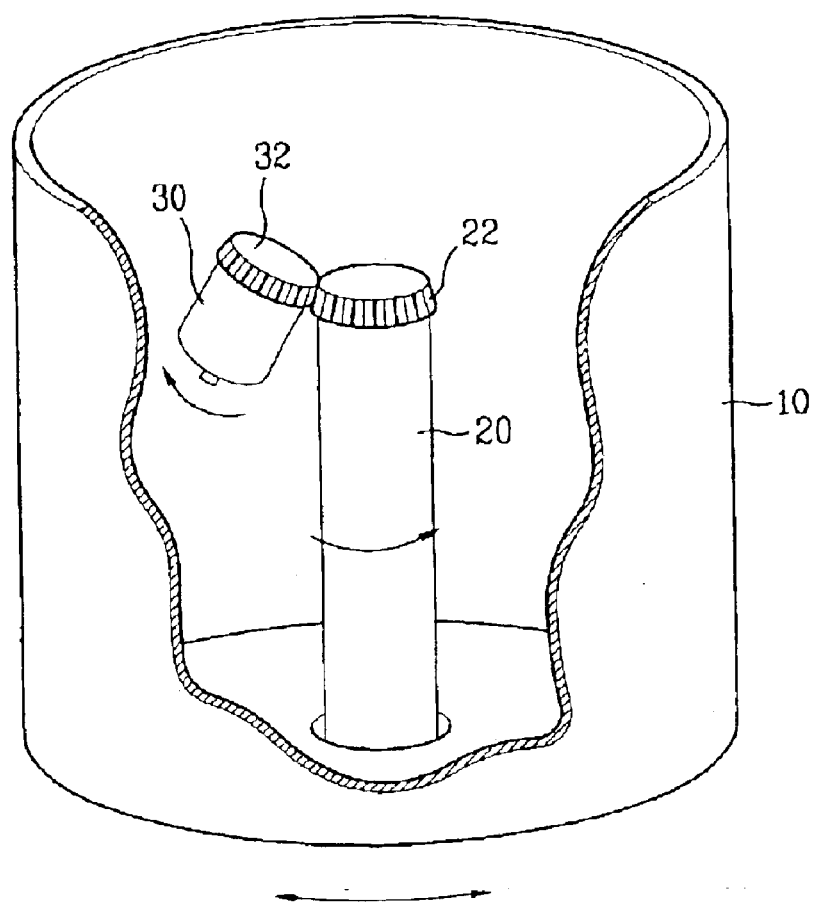
FIG. 2A is a partial-cut perspective view of a related art apparatus for removing bubbles from a sealant for fabricating a liquid crystal display device.
Figure 2B:
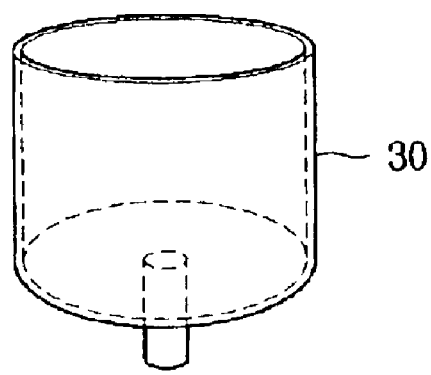
FIG. 2B is a perspective view of a related art bubble removing container of the apparatus in FIG. 2A.
Figure 3:
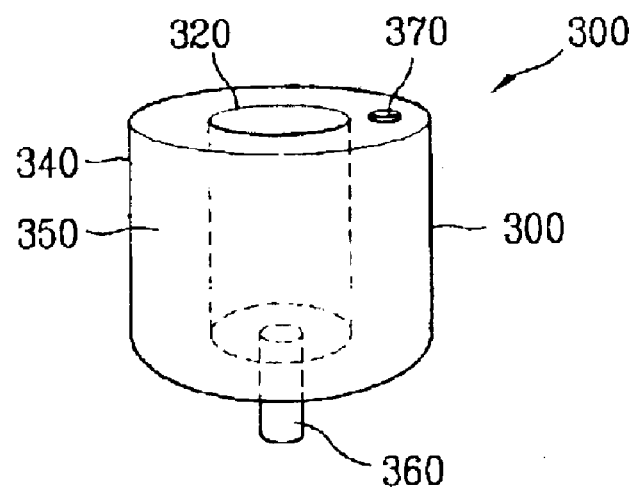
FIG. 3 is a perspective view of a bubble removing container according to the present invention.

FIG. 3 is a perspective view of a bubble removing container according to the present invention.

As shown in FIG. 3, the bubble removing container includes an interior container 320 and an exterior container 340 surrounding the interior container 320.

The interior container 320 provides a space for accommodating a sealant and removing bubbles formed in the sealant before the sealant is dispensed on the liquid crystal display panel. A discharge port 360 for discharging the sealant from which the bubble is completely removed, is formed at the bottom of the interior container 320.

A space 350 is provided between the interior container 320 and the exterior container 340, and the space 350 is filled with cooling water. To this end, an inlet port 370 is formed on the exterior container 340 for introducing the cooling water therein.

A drain port 360 for discharging the cooling water is formed on a lower portion of the exterior container 340.

Since the interior container 320 containing the sealant is surrounded by the cooling water, even though there is friction between the sealant and the inside wall of the interior container 320, heat is not generated because of the cooling water, thereby preventing the sealant from changing its characteristics.

Figure 4:
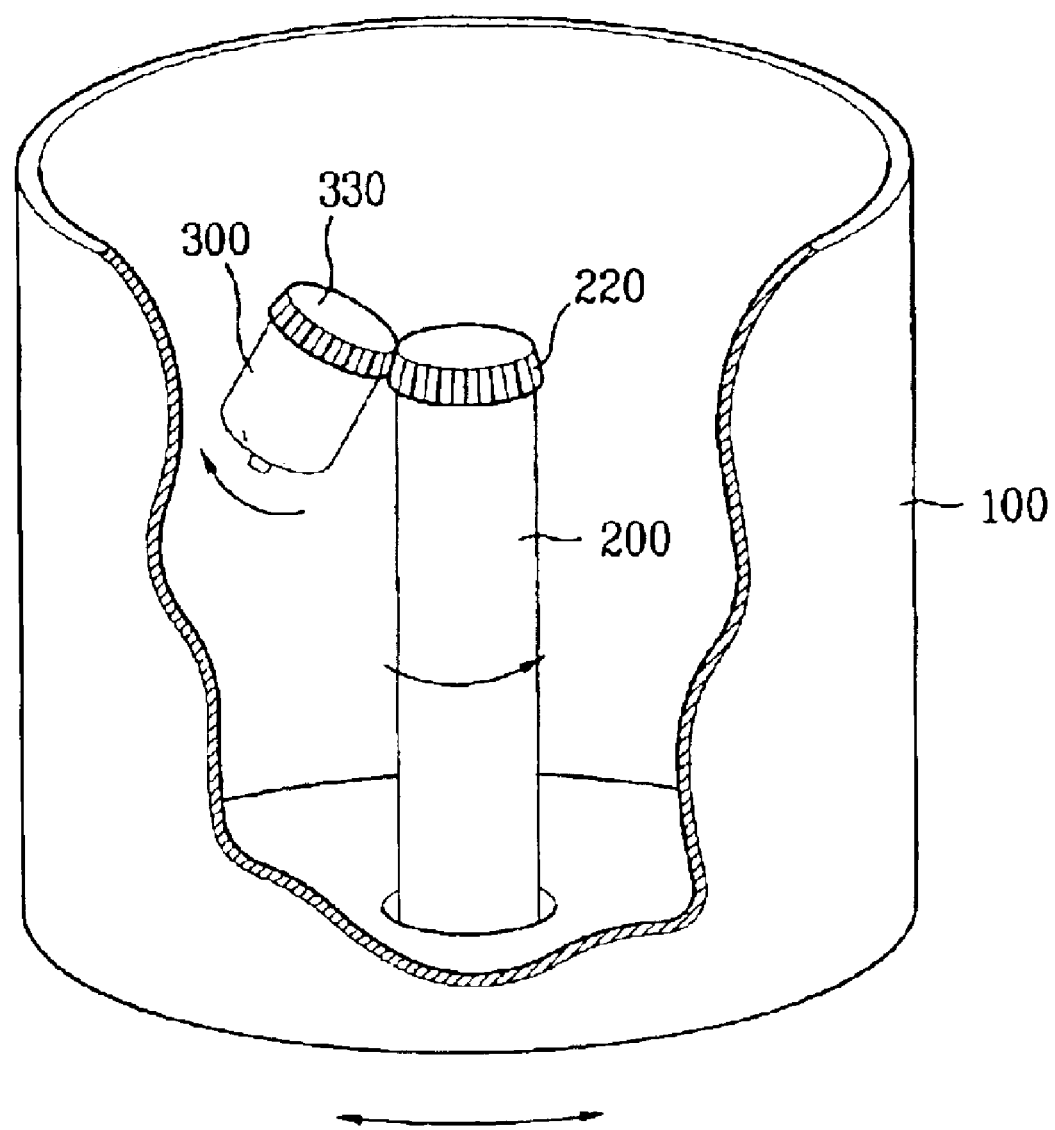
FIG. 4 is a perspective view of an apparatus for removing bubbles from a sealant according to the present invention.

FIG. 4 is a perspective view of an apparatus for removing bubbles from a sealant using the bubble removing container of FIG. 3 according to the present invention.

As shown in FIG. 4, the apparatus for removing bubbles from the sealant according to the present invention includes a drum 100, a rotating shaft 200 formed in the drum 100, and a bubble removing container 300.

A first gear 220 is formed at an upper portion of the rotating shaft 200. A second gear 330 is formed at an upper portion of the bubble removing container 300. Herein, the first gear 220 matches the second gear 330.

Accordingly, as the rotating shaft 200 rotates, the bubble removing container 300 rotates as well. Also, as the drum 100 rotates, the bubble removing container 300 rotates in large circles.

Specifically, the bubble removing container 300 rotates on its axis by the rotation of the rotating shaft 200 while revolving around the rotating shaft 200 by the rotation of the drum 100.

At this point, cooling water is introduced into the bubble removing container 300, as shown in FIG. 3.

Accordingly, bubbles are removed from the sealant while the bubble removing container 300 containing the sealant rotates on its axis and revolves around the rotating shaft 200.

The present embodiment discloses that only a single bubble removing container 300 is coupled to a single rotating shaft 200, as shown in FIG. 4. However, a third gear may be provided to match the first gear 220 formed at an upper portion of the rotating shaft 200, and the bubble removing container may be positioned below the third gear.

According to the above description of the present invention, the interior container is filled with cooling water, thereby preventing the sealant from changing its characteristics during the process of removing bubbles from the sealant.

It will be apparent to those skilled in the art that various modifications and variations can be made in the apparatus for removing bubbles from a sealant for fabricating the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A container for removing bubbles from a sealant, comprising:

an interior container accommodating a sealant;

an exterior container surrounding the interior container;

a space receiving cooling water between the interior container and the exterior container;

a sealant discharge port at a lower portion of the interior container; and a water introducing port at the exterior container.

2. The container according to claim 1, further comprising a cooling water drain port at the exterior container.

3. A method of using the container according to claim 1, comprising:

introducing a sealant into the container;

removing bubbles from the sealant by rotating the container;

forming the bubble removed sealant on one of first and second substrates; and bonding the first and second substrates to each other.

4. An apparatus for removing bubbles from a sealant, comprising:

a drum;

a rotating shaft in the drum;

a first gear at an upper portion of the rotating shaft;

a second gear matching the first gear; and a container at a lower portion of the second gear including an interior container accommodating a sealant, an exterior container surrounding the interior container, a space receiving cooling water between the interior container and the exterior container, a sealant discharge port at a lower portion of the interior container, and a water introducing port at the exterior container.

5. The apparatus according to claim 4, further comprising:

a third gear matching the first gear; and a container at a lower portion of the third gear.

6. The apparatus according to claim 4, further comprising a water drain port at the exterior container.

7. The apparatus according to claim 5, wherein the container includes an interior container and an exterior container.

8. The apparatus according to claim 7, wherein the interior container contains a sealant.

9. The apparatus according to claim 7, wherein the exterior container surrounds the interior container.

10. The apparatus according to claim 7, wherein the exterior container has a cooling water drain port.

11. A method of using the apparatus according to claim 4, comprising:

introducing a sealant into the apparatus;

removing bubbles from the sealant by rotating the apparatus;

forming the bubble removed sealant on one of first and second substrates; and bonding the first and second substrates to each other.

* * * * *